United States Patent
Kim et al.

(10) Patent No.: US 8,719,343 B2
(45) Date of Patent: May 6, 2014

(54) MEMBERSHIP MANAGEMENT SYSTEM AND METHOD FOR USING A COMMUNITY PAGE

(75) Inventors: Kwang Jun Kim, Seongnam-si (KR); Yea Sun Yoon, Seongnam-si (KR)

(73) Assignee: NHN Corporation, Seongsam-si (KR)

( * ) Notice: Subject to any disclaimer, the term of this patent is extended or adjusted under 35 U.S.C. 154(b) by 12 days.

(21) Appl. No.: 13/237,791

(22) Filed: Sep. 20, 2011

(65) Prior Publication Data

US 2012/0084360 A1    Apr. 5, 2012

(30) Foreign Application Priority Data

Sep. 30, 2010    (KR) .................. 10-2010-0095263

(51) Int. Cl.
*G06F 15/16* (2006.01)

(52) U.S. Cl.
USPC .......................................... 709/204; 709/203

(58) Field of Classification Search
USPC ................................................. 709/204, 203
See application file for complete search history.

(56) References Cited

U.S. PATENT DOCUMENTS

| | | | | |
|---|---|---|---|---|
| 6,944,866 | B1 * | 9/2005 | MacPhail ...................... | 719/318 |
| 7,222,163 | B1 * | 5/2007 | Girouard et al. .............. | 709/219 |
| 7,370,077 | B2 * | 5/2008 | Pradhan et al. ............... | 709/204 |
| 7,493,396 | B2 * | 2/2009 | Alcorn et al. ................. | 709/225 |
| 2002/0177109 | A1 * | 11/2002 | Robinson et al. ............. | 434/118 |
| 2003/0006912 | A1 * | 1/2003 | Brescia ......................... | 340/990 |
| 2006/0026237 | A1 * | 2/2006 | Wang et al. ................... | 709/206 |
| 2007/0073823 | A1 * | 3/2007 | Cohen et al. .................. | 709/207 |
| 2007/0219958 | A1 * | 9/2007 | Park et al. ......................... | 707/3 |
| 2008/0021958 | A1 * | 1/2008 | Foote ............................ | 709/204 |
| 2008/0120396 | A1 * | 5/2008 | Jayaram et al. ............... | 709/218 |
| 2008/0161082 | A1 * | 7/2008 | Walker et al. .................... | 463/9 |
| 2008/0235230 | A1 * | 9/2008 | Maes ............................... | 707/9 |
| 2008/0255870 | A1 * | 10/2008 | Butler .............................. | 705/1 |
| 2009/0109959 | A1 * | 4/2009 | Elliott et al. ................. | 370/352 |
| 2009/0245500 | A1 * | 10/2009 | Wampler ................. | 379/265.09 |
| 2009/0271847 | A1 * | 10/2009 | Karjala et al. .................... | 726/6 |
| 2010/0064007 | A1 * | 3/2010 | Randall ........................ | 709/204 |
| 2010/0153488 | A1 * | 6/2010 | Mittal et al. ................. | 709/203 |
| 2010/0306054 | A1 * | 12/2010 | Drake et al. ................ | 705/14.53 |
| 2010/0332326 | A1 * | 12/2010 | Ishai ........................... | 705/14.58 |
| 2011/0016172 | A1 * | 1/2011 | Shah ............................ | 709/203 |
| 2011/0035287 | A1 * | 2/2011 | Fox ............................. | 705/14.69 |
| 2011/0137732 | A1 * | 6/2011 | Averbeck ................... | 705/14.66 |
| 2011/0320373 | A1 * | 12/2011 | Lee et al. ..................... | 705/319 |
| 2012/0042013 | A1 * | 2/2012 | Roman et al. ................ | 709/204 |
| 2012/0158531 | A1 * | 6/2012 | Dion et al. ................... | 705/26.1 |

* cited by examiner

*Primary Examiner* — Waseem Ashraf
(74) *Attorney, Agent, or Firm* — Greer Burns & Crain Ltd.

(57) ABSTRACT

A system and method for managing membership in real-time using a community page that enables communication between a member and a provider is disclosed herein. The membership management system may include an information transferring unit to transfer access information, used to encourage an access to a community page associated with or created by the provider, to at least one member, and a business information providing unit to provide business information of the provider to members who access the community page, via the community page. The membership management system may transmit information associated with an access to a community page to a member, thereby encouraging the member to access the community page. Therefore, the community page may provide real-time communication between the provider and the member.

18 Claims, 4 Drawing Sheets

MEMBERSHIP MANAGEMENT SYSTEM AND METHOD FOR USING A COMMUNITY PAGE

CROSS-REFERENCE TO RELATED APPLICATION

This application claims priority from and the benefit of Korean Patent Application No. 10-2010-0095263, filed on Sep. 30, 2010, which is hereby incorporated by reference for all purposes as if fully set forth herein.

BACKGROUND OF THE INVENTION

1. Field of the Invention

Exemplary embodiments of the present invention relate to a membership management system and method of providing, and more particularly, to a system and method for managing membership in real-time using a community page that enables communication with a member.

2. Discussion of the Background

A conventional membership management system employs a method of receiving a query from a member, and creating an answer based on the query, and displaying the created answer using a homepage of the system, and transmitting an event notice to members using a text message, and the like.

The above homepage for querying and answering uses a bulletin board, thereby files go through a refresh process in order to verify new writings. The writings may be postings on a message board. Therefore, due to this verification, it may be difficult for the conventional system to produce and display an answer to a query from a member in real-time.

In addition, if an event for members is held, the system may transmit a text message to the members and the members may have to discover an event site based on the text message, and thus, a participation in an event may be low.

Accordingly, based on the above, the conventional systems and methods do not provide answers to a query of a member in real-time, and do not enable a user to easily access an event site using access information that is transmitted along with event information of an event being notified by the system, since the event information does not include information of an event site when the provider holds an event.

The above information disclosed in this Background section is only for enhancement of understanding of the background of the invention and therefore it may contain information that does not form any part of the prior art.

SUMMARY OF THE INVENTION

Exemplary embodiments of the present invention provide a system and method that enables a community page to provide real-time communication between providers and members by transmitting information associated with an access to the community page, information enabling the real-time communication, and by encouraging the members to access the community page.

Exemplary embodiments of the present invention also provide a system and method that enables a member to participate in an event held by a provider by transmitting event information and information associated with an access to a corresponding community page that is viewed by the members.

Additional features of the invention will be set forth in the description which follows, and in part will be apparent from the description, or may be learned by practice of the invention.

An exemplary embodiment of the present invention discloses a membership management system, including: an information transferring unit to transfer access information of a provider of a community page to a member of the community page, the access information being associated with an access to the community page; and a business information providing unit to provide business information of the provider to members who access the community page, via the community page.

An exemplary embodiment of the present invention discloses a membership management method, including: transferring access information of a provider of a community page to a member of the community page, the access information being associated with an access to the community page; and providing business information of the provider to members who access the community page, via the community page.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
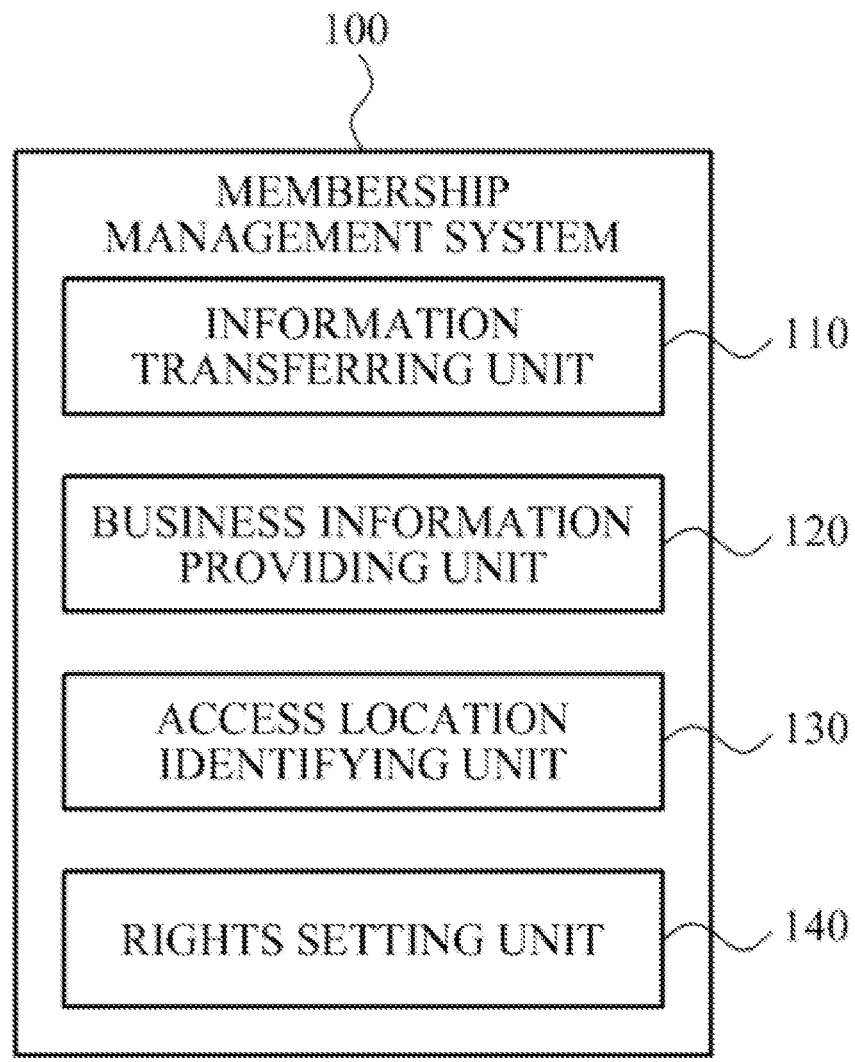
FIG. 1 is a block diagram illustrating a configuration of a membership management system according to an exemplary embodiment of the present invention.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A membership management method according to an exemplary embodiment of the present invention may be performed by a membership management system; however, it is not limited to and may be incorporated in other systems and/or devices.

FIG. 1 is a block diagram illustrating a configuration of a membership management system 100 according to an exemplary embodiment of the present invention.

The membership management system 100 may transmit access information of a community page to a member, thereby encouraging the member to access the community page, and thus, enabling real-time communication between a provider (not shown) of the community page and the member, with the communication being delivered in association with the accessed community page.

Referring to FIG. 1, the membership management system 100 includes an information transferring unit 110, a business information providing unit 120, an access location identifying unit 130, and a rights setting unit 140.

The member management system 100 may provide various information to a member, some of the members and/or all of the members. The member management system 100 may control a provider (not shown), to deliver various information, such as a community page and the like, to the various members. For the purpose of this disclosure, if the member management system 100 does deliver, transfer or provide information, the processes may be done through a provider that is incorporated in the member management system 100 or an external provider that communicates with the member management system 100.

The information transferring unit 110 may transfer access information, which is used to encourage access to a community page, to at least one member of the provider. The access information may be delivered in the form of an email and/or a text message, and the message may provide a link to the community page.

The information transferring unit 110 may include event information of the provider in the access information, and may transfer the access information to the at least one member of the member management system 100. For example, the event information may be information about an event that the provider provides to the members, information about a product or a service, and the like. Also, the event information may be determined based on the access location of the member.

Specifically, a provider may set an area based on a distance from a place of a business or an administrative district, and may store the set area in the access location identifying unit 130. The access location identifying unit 130 may set different event information for each area, thereby enabling a member to receive different event information based on a location of the member.

The information transferring unit 110 may transfer the access information to members that access the community page, if the members are within a specific area in reference to a place of business, or the like, of the provider.

For example, the information transferring unit 110 may set an area if it is determined that the member moves to a specific place of business within a specified period of time. Further, the information transferring unit 110 may transfer to members positioned within the set area access information including the event information, which may further include other information such as a notification that the provider offers a discount service associated with the specific place of business.

Also, the information transferring unit 110 may transfer access request information, which is scheduled to be requested at a current time corresponding to a specific time range set by the provider.

For example, the information transferring unit 110 may receive, from the provider, a scheduled access request information to be transferred for certain ranges of time and/or specific times. Thus, an access request information to be transferred at 9 o'clock, access request information to be transferred at 11:50 a.m., and the like may be received. If the current time corresponds with one the schedule times, the information transferring unit 110 may transfer the corresponding access request information to the member.

In another example, a restaurant owner may encourage members who desire to have lunch at a specific time, such as a lunch time, to come to the restaurant, and to have lunch at the restaurant by setting event information that is delivered to the members at the appropriate time. The restaurant owner may accomplish this by providing a discount service along with access request information, if members visit the restaurant, or near the restaurant, at a certain time corresponding to the lunch time.

The business information providing unit 120 may provide, using the community page, business information of the provider to members that access the community page.

In this example, the community page refers to a page that displays content created/added by the members or content created/added by the provider. The content may be text, images or other objects. Also, the community page may provide an interface that enables content to be shared between members of the provider.

For example, the community page may display a query entered by a member, and an answer based on a response to the query from the provider. If the event information is included in the access information, the business information providing unit 120 may display the event information on the community page.

By maintaining information, such as text, created by the member and a text created by the provider for a specified period of time, the community page may also enable a member who accesses the community page during the specified period of time to verify the information, such as the text, created by other members before other members access the community page.

Also, an interface provided by the community page may be a chat room interface that displays information, such as text and the like, and is created by members and the provider in real-time.

The community page may further include an interface for executing various events based on instruction from a provider, and to provide events and event information to a member who accesses the community page.

The access location identifying unit 130 may identify an access location of a member based on profile information of the member. The profile information may include at least one of the following pieces of information associated with a member: a mobile terminal number, an email address, a residence, a workplace, working hours, and the like. The access location may indicate a location at which the member may access the community page using a mobile terminal, a personal computer (PC), and the like.

For example, the access location identifying unit 130 may identify the access location of the member by identifying a location of a mobile terminal based on the mobile terminal number of the member.

In another example, the access location identifying unit 130 may select the access location of the member as one of either the workplace of the member or the residence of the member, based on working hours of the member and a current time, and may thereby identify the access location of the member.

Thus, if the working hours of the member are from 9:00 a.m. to 6:00 p.m., the access location identifying unit 130 may access the access location of the member as the workplace of the member if the current time is between 9:00 a.m. to 6:00 p.m., and may identify the access location of the member as the residence of the member when the current time is between 6:00 p.m. and 9:00 a.m.

The rights setting unit 140 may set permissions/rights to enter content in the community page for each member.

In an example, the rights setting unit 140 may assign a permission to answer with respect to a query of another member, to a member who purchases at least a specified number of products among products of the provider, and may provide a permission to read content provided by other members or the provider, to a member who does not purchase a product. In addition, the rights setting unit 140 may assign a permission to create a query text to a member who purchases a single product among the products of the provider.

In another example, the rights setting unit 140 may assign a permission to create a text, to a member who purchases a product of the provider, and may assign only a permission to read texts created by other members or the provider, to a member who has not purchased the product.

Figure 2:
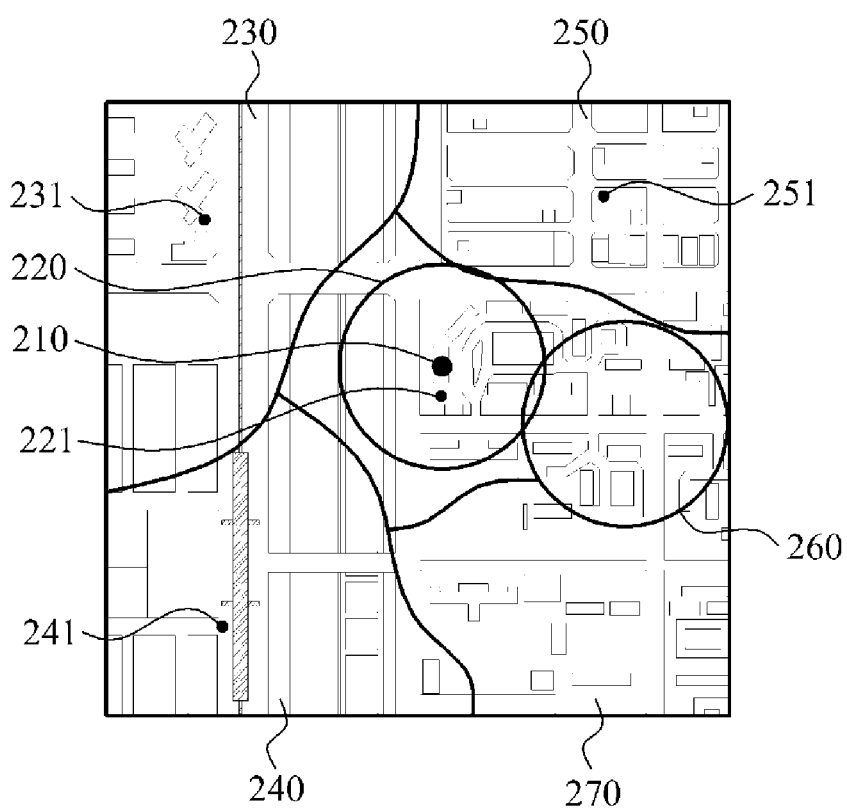
FIG. 2 is a view illustrating an example of a membership management system transmitting access information based on an access location of a member according to an exemplary embodiment of the present invention.

FIG. 2 is a view illustrating an example of a membership management system transmitting access information based on an access location of a member according to an exemplary embodiment of the present invention.

As shown in FIG. 2, the access location identifying unit 130 may set an area 220 within a specific distance from a place of business 210, or may set at least one area, for example as shown in FIG. 2, areas 230, 240, 250, 260, and 270, each corresponding to an administrative district.

The access location identifying unit 130 may set different event information for each set area. In an example, the access location identifying unit 130 may set to the area 220, a first event information to encourage members to visit the place of business 210, may set, to the area 230, a second event information to encourage the members to visit a branch included in the area 230, and may also set, to the areas 240 and 250, respectively, third event information and fourth event information that is different from each other. Thus, various information may be correlated to various areas, and used to identify a member who accesses a community page, the information based on the member being in and/or around one of the various areas.

The access location identifying unit 130 may identify access locations of members 221, 231, 241, and 251 based on profile information of the members 221, 231, 241, and 251.

The information transferring unit 110 may transfer different event information based on locations of the members 221, 231, 241, and 251.

For example, the information transferring unit 110 may include first event information along with the access information, thereby transferring the first event information to the member 221 if positioned within the area 220. Also, the information transferring unit 110 may include second event information along with the access information, thereby transferring the second event information to the member 231 positioned within the area 230. Also, the information transferring unit 110 may include third event information and/or fourth event information along with the access information, thereby transferring the third event information and/or fourth event information to the member 241 or 251 positioned within the area 241 or 251.

Figure 3:
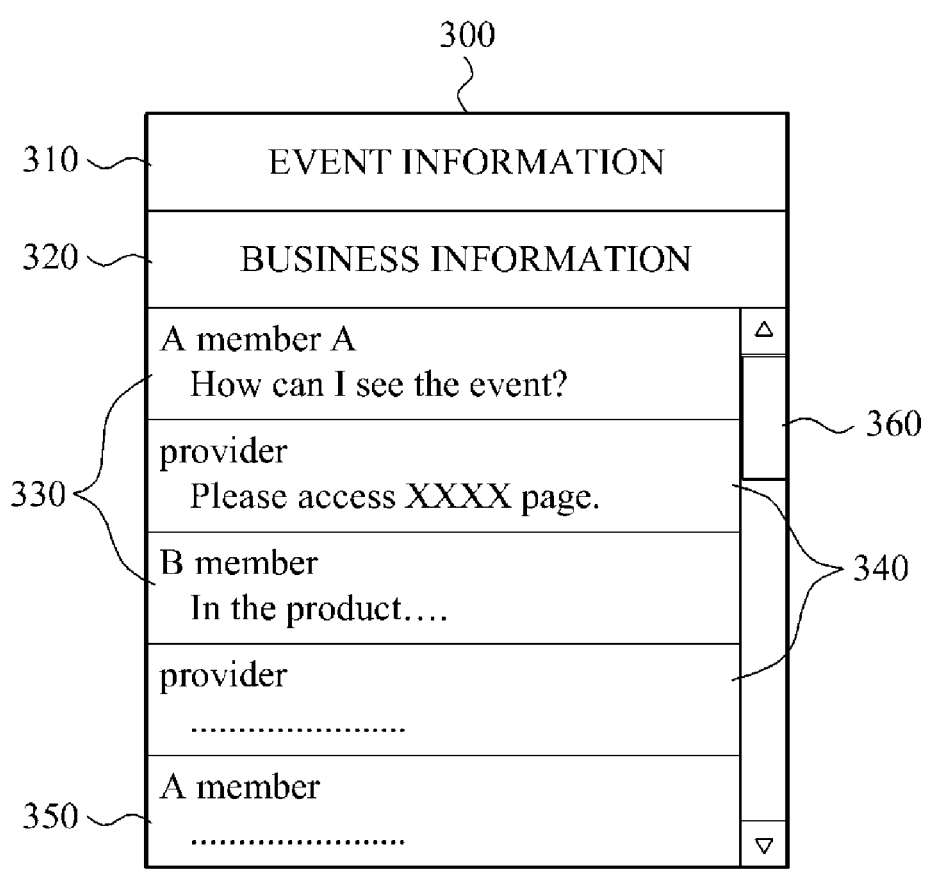
FIG. 3 is a view illustrating an example of a community page according to an exemplary embodiment of the present invention.

FIG. 3 is a view illustrating an example of a community page 300 according to an exemplary embodiment of the present invention.

Referring to FIG. 3, the community page 300 provided to a member may include at least one of: event information 310, business information 320, query texts 330 created by members, answer texts 340 created by a provider, and an answer text 350 created by the member.

The event information 310 may be included in access information. The business information 320 may be information that the provider desires to notify the members of.

A member may create a query text, for example, one of the query texts 330 and the answer text 350, based on permissions set by the rights setting unit 140. Prior to accessing the community page 300, the member may verify and view queries and answers entered by other members and providers using a scroll button 360. In this example, the scroll button 360 may scroll only query texts and answer texts, for example, the query texts 330 and the answer text 340, thereby enabling the event information 310 and the business information 320 to be displayed for members in a real-time fashion.

The query texts 330 created by one member and the answer text 350 created by another member may have associated permissions, and thus, the community page 300 may include a text that includes suggestions of members or communication between the members, content desired to be shared between the members, and the like.

Figure 4:
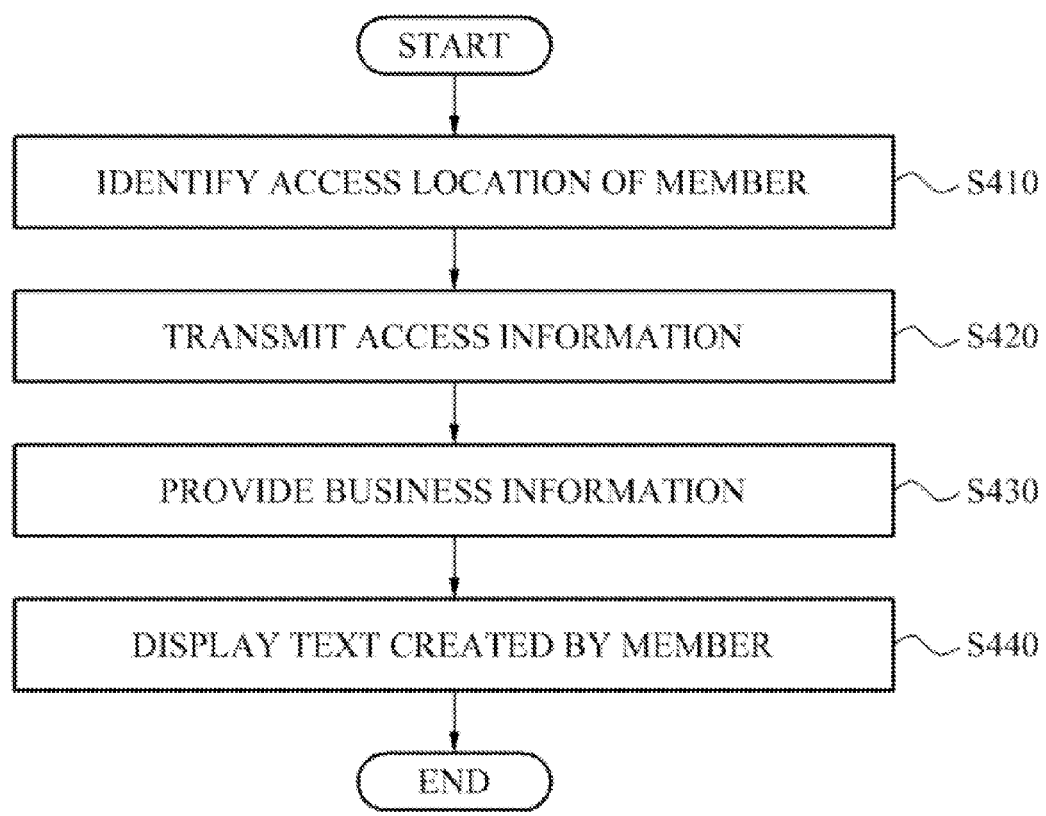
FIG. 4 is a flowchart illustrating a membership management method according to an exemplary embodiment of the present invention.

FIG. 4 is a flowchart illustrating a membership management method according to an exemplary embodiment of the present invention.

In operation S410, the access location identifying unit 130 may identify an access location of a member based on profile information and/or a current location of the member.

In an example, the access location identifying unit 130 may identify the access location of the member by identifying a location of a mobile terminal using a mobile terminal number of the member.

In an example, the access location identifying unit 130 may select the access location of the member as one of a workplace of the member and a residence thereof, based on working hours of the member and a current time, and may thereby identify the access location of the member.

In operation S420, the information transferring unit 110 may transmit access information to members based on the identified access location of the member.

For example, the information transferring unit 110 may transfer access information including different event information based on the identified access location.

In operation S430, the business information providing unit 120 may provide business information of the provider to a member who accesses the community site, based on the transferred access information.

In operation S440, the information providing unit 120 may display a text created by the member, to other members who access the community site and/or page, based on the transferred access information and may display texts created by the other members to the member, thereby providing communication between the member and the other members or the provider.

According to exemplary embodiments of the present invention, a community page may provide real-time communication between a provider and members by transmitting information associated with an access to the community page that enables the real-time communication and by inducing the members to access the community page.

Also, according to exemplary embodiments of the present invention, a member may readily participate in an event held by a provider by transmitting event information and information associated with an access to a corresponding community page to members.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A membership management system, comprising:
   a memory including,
      an information transferring unit to transmit access information of a provider of a community page to at least one member of the community page, the access information being received by the at least one member;
      a business information providing unit to provide business information of the provider in response to the at least one member accessing the community page;
      a rights setting unit configured to assign a permission to answer a query of the at least one member to a member determined to have purchased at least a threshold number of products of the provider, to not assign the permission to answer a query of the at least one member to a member determined not to have purchased at least the threshold number of products of the provider, and to assign a permission to read content provided by other members or the provider to a member determined not to have purchased at least the threshold number of products of the provider; and
      a processor in communication with said memory for executing functions of the information transferring unit, the business information providing unit and the rights setting unit;
      wherein the community page is configured to provide a chat room interface to display information created by the at least one member and the provider in real time.

2. The system of claim 1, wherein the information transferring unit is configured to transmit the access information to the member based on the at least one member being within a specified area from the provider.

3. The system of claim 1, wherein the access information comprises event information.

4. The system of claim 3, wherein the event information is based on an access location of the at least one member.

5. The system of claim 1, wherein the information transferring unit is configured to transmit the access information at a set time, based on the set time corresponding with a scheduled specific time or a scheduled range of time.

6. The system of claim 1, wherein the community page is configured to display texts created by a plurality of members of the community page.

7. The system of claim 1, wherein the community page is configured to provide an interface to share content between a plurality of members of the community page.

8. A membership management method, comprising:
   transmitting access information of a provider of a community page to at least one member of the community page, the access information being received by the at least one member; providing business information of the provider in response to the at least one member accessing the community page;
   assigning a permission to answer a query of the at least one member to a member determined to have purchased at least a threshold number of products of the provider;
   not assigning the permission to answer a query of the at least one member to a member determined not to have purchased at least the threshold number of products of the provider; and
   assigning a permission to read content provided by other members or the provider to a member determined not to have purchased at least the threshold number of products of the provider;
   wherein the community page is configured to provide a chat room interface to display information created by the at least one member and the provider in real time.

9. The method of claim 8, wherein the transmitting is performed when the at least one member accesses the community page within a specified geographical area from the provider.

10. The method of claim 8, wherein the access information comprises event information.

11. The method of claim 10, wherein the event information is based on an access location of the at least one member.

12. The method of claim 8, further comprising transmitting the access information at a set time when the set time corresponds to a specific scheduled time or scheduled time range.

13. The method of claim 8, further comprising displaying on the community page, texts created by a plurality of members of the community page.

14. The method of claim 8, wherein the community page comprises an interface configured to enable sharing of content between a plurality of members of the community page.

15. The system of claim 1, wherein the access information comprises discount information associated with the business information.

16. The method of claim 8, wherein the access information comprises discount information associated with the business information.

17. The system of claim 1, wherein the community page is further configured to provide other members who access the community page during a period of time information created by the at least one member and the provider before the other members access the community page.

18. The method of claim 8, further comprising maintaining for a period of time information created by the at least one member and the provider before other members access the community page, to provide the information to the other members accessing the community page.

\* \* \* \* \*